(12) United States Patent
Ucar et al.

(10) Patent No.: US 11,443,636 B2
(45) Date of Patent: Sep. 13, 2022

(54) SYSTEMS AND METHODS OF PLATOON LEADERSHIP AS A SERVICE

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 223 days.

(21) Appl. No.: 16/867,983

(22) Filed: May 6, 2020

(65) Prior Publication Data

US 2021/0350707 A1   Nov. 11, 2021

(51) Int. Cl.
| | |
|---|---|
| G08G 1/00 | (2006.01) |
| H04W 4/40 | (2018.01) |
| H04W 4/06 | (2009.01) |
| G06F 16/23 | (2019.01) |
| G01C 21/34 | (2006.01) |
| G08G 1/123 | (2006.01) |
| G06F 16/245 | (2019.01) |
| H04W 4/02 | (2018.01) |

(52) U.S. Cl.
CPC ........... *G08G 1/22* (2013.01); *G01C 21/3438* (2013.01); *G06F 16/2379* (2019.01); *G06F 16/245* (2019.01); *G08G 1/123* (2013.01); *H04W 4/02* (2013.01); *H04W 4/06* (2013.01); *H04W 4/40* (2018.02)

(58) Field of Classification Search
CPC ........... G08G 1/22; G08G 1/123; H04W 4/40; H04W 4/02; H04W 4/06; G06F 16/2379; G06F 16/245; G01C 21/3438
See application file for complete search history.

(56) References Cited

U.S. PATENT DOCUMENTS

| | | | |
|---|---|---|---|
| 8,352,111 B2 | 1/2013 | Mudalige | |
| 10,353,387 B2* | 7/2019 | Stenneth | .......... G06Q 10/06315 |
| 2003/0182183 A1 | 9/2003 | Pribe | |
| 2009/0157461 A1 | 6/2009 | Wright et al. | |

(Continued)

FOREIGN PATENT DOCUMENTS

WO   2020007987 A1   1/2020

*Primary Examiner* — Hussein Elchanti
(74) *Attorney, Agent, or Firm* — Christopher G. Darrow; Darrow Mustafa PC

(57) ABSTRACT

System, methods, and embodiments described herein relate to providing platoon leadership as a service. At least one method includes receiving, from a platoon, a request for a platoon leader, the request indicating a location and a situation class, sending out a search query for a vehicle having experience in handling the situation class, receiving, from a responding vehicle, a response to the search query, the response indicating an experience level in handling the situation class, selecting the responding vehicle as a new leader based at least in part on the response, assigning the new leader to the platoon and providing instructions to the new leader that cause the new leader to assume a lead position in the platoon and lead the platoon through an area exhibiting the situation class.

20 Claims, 6 Drawing Sheets

(56) References Cited

U.S. PATENT DOCUMENTS

| | | |
|---|---|---|
| 2010/0114541 A1* | 5/2010 | Johnson ................ G06N 5/003 703/2 |
| 2013/0080041 A1* | 3/2013 | Kumabe ................ G05D 1/024 701/117 |
| 2014/0244144 A1 | 8/2014 | You |
| 2016/0026187 A1 | 1/2016 | Alam et al. |
| 2018/0120861 A1* | 5/2018 | Saxena .................... G08G 1/22 |
| 2019/0044728 A1* | 2/2019 | Karmoose ............. H04L 9/3297 |
| 2019/0349719 A1* | 11/2019 | Pattan .................... H04W 4/08 |
| 2019/0378418 A1* | 12/2019 | Menadue ............. G05D 1/0295 |
| 2020/0186290 A1* | 6/2020 | Zhang ................. H04W 76/14 |
| 2020/0249699 A1* | 8/2020 | Kim .................... G05D 1/0295 |
| 2021/0264793 A1* | 8/2021 | Shuman ............... G08G 1/0145 |
| 2022/0061068 A1* | 2/2022 | Liu ......................... H04W 4/08 |
| 2022/0104200 A1* | 3/2022 | Zang .................... H04W 72/02 |

* cited by examiner

| Profile ID | Sit. Class Code | Grade | Count |
|---|---|---|---|
| 1145 | PL-Con1 | 75 | 3 |
| 1151 | PL-HWS | 68 | 5 |
| 1152 | S-Con2 | 89 | 23 |
| 1161 | S-SZ1 | 92 | 28 |

SYSTEMS AND METHODS OF PLATOON LEADERSHIP AS A SERVICE

TECHNICAL FIELD

The subject matter described herein relates, in general, to a system and method for leading vehicle platoons, and, more particularly, to providing and maintaining a leadership-as-a-service system for vehicle platoons.

BACKGROUND

Two or more vehicles can be grouped into "platoons", which are an associated group of vehicles that are typically led by a "leader." Vehicles in a platoon tend to travel at substantially the same speed and with relatively small spacing between the vehicles. The vehicles in the platoon that follow the leader are referred to as "platoon followers," and may implement conventional techniques to aid in platoon control such as cooperative adaptive cruise control (CACC), mobile ad hoc networks, incentive-based systems, or other travel-related systems and/or protocols.

Platooning can provide numerous benefits for participating vehicles, including greater fuel economy, fewer traffic collisions, and reduced driver fatigue. However, platoons may periodically encounter challenging situations that require special or particular skills/capabilities to successfully navigate as a platoon.

SUMMARY

The disclosed devices, systems and methods relate to providing leadership-as-a-service for vehicular platoons in order to match a platoon with a leader that is experienced with a particular situation the platoon is anticipating or encountering.

In one embodiment, a system includes one or more processors and a memory communicably coupled to the one or more processors. The memory can store a regional manager module including instructions that when executed by the one or more processors cause the one or more processors to receive, from a platoon, a request for a platoon leader. The request can indicate a location and a situation class. The regional manager module can further include instructions to send out a search query requesting a response from a vehicle having experience in handling the situation class.

The memory can also store a selection module including instructions that when executed by the one or more processors cause the one or more processors to receive, from a responding vehicle, a response to the search query, the response indicating an experience level in handling the situation class, and to select the responding vehicle as a new leader based at least in part on the response.

The memory can further store a platoon manager module including instructions that when executed by the one or more processors cause the one or more processors to assign the new leader to the platoon and provide instructions to the new leader that cause the new leader to assume a lead position in the platoon and lead the platoon through an area exhibiting the situation class.

In another embodiment, a method for providing platoon leadership as a service includes receiving, from a platoon, a request for a platoon leader, the request indicating a location and a situation class, sending out a search query for a vehicle having experience in handling the situation class.

The method further includes receiving, from a responding vehicle, a response to the search query, the response indicating an experience level in handling the situation class, selecting the responding vehicle as a new leader based at least in part on the response, assigning the new leader to the platoon and providing instructions to the new leader that cause the new leader to assume a lead position in the platoon and lead the platoon through an area exhibiting the situation class.

In yet another embodiment, a system includes a vehicle onboard unit including a first set of one or more processors and a first memory communicably coupled to the first set of one or more processors. The first memory can store a classifier module including instructions that when executed by the first set of one or more processors cause the first set of one or more processors to determine or predict a situation class for an environment the vehicle is traveling through.

The first memory can also store a tracking module including instructions that when executed by the first set of one or more processors cause the first set of one or more processors to maintain an experience rating associated with the situation class, the experience rating indicating an amount of experience the vehicle has in handling the situation class.

The system can further include a server including a second set of one or more processors and a second memory communicably coupled to the second set of one or more processors. The second memory can store a regional manager module including instructions that when executed by the second set of one or more processors cause the second set of one or more processors to receive, from a platoon, a request for a platoon leader, the request indicating a location and the situation class, and broadcast a search query for a vehicle having experience in handling the situation class.

The second memory can also store a selection module including instructions that when executed by the second set of one or more processors cause the second set of one or more processors to receive, from the responding vehicle, a response to the search query with the response indicating an experience level, and select the responding vehicle as a new leader based at least in part on the response.

The second memory can also store a platoon manager module including instructions that when executed by the second set of one or more processors cause the second set of one or more processors to assign the new leader to the platoon, coordinate a rendezvous between the new leader and the platoon, and provide instructions to the new leader that cause the new leader to join the platoon and lead the platoon through an area exhibiting the situation class.

In still another embodiment, a method for providing platoon leadership as a service includes determining or predicting a situation class for an environment a responding vehicle is traveling through, maintaining an experience rating associated with the situation class, the experience rating indicating an amount of experience the responding vehicle has in handling the situation class.

The method further includes receiving, from a platoon, a request for a platoon leader, the request indicating a location and the situation class, sending out a search query for a vehicle having experience in handling the situation class, and receiving, from a responding vehicle, a response to the search query, the response indicating an experience level in handling the situation class.

The method also includes selecting the responding vehicle as a new leader based at least in part on the response, assigning the new leader to the platoon and providing instructions to the new leader that cause the new leader to assume a lead position in the platoon and lead the platoon through an area exhibiting the situation class.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with providing platoon leadership as a service are disclosed. A vehicular platoon may encounter many different types of situations, some of which may present unique difficulties in traversing or completing. Such situations may include, for example, getting past a type of incident, completing a complicated maneuver, or traversing a type of zone. In many cases a platoon leader may encounter a situation that the platoon leader has little or no experience in leading a platoon through. In such cases there is an increased risk of an accident or significant delay occurring due to the platoon leader's lack of experience.

Therefore, the disclosed embodiments provide a leader-as-a-service system that can match a platoon with a new leader according to a given situation and experience level of the new leader. For example, a platoon that encounters a challenging situation that a current platoon leader has low experience in handling can communicate a request for a new platoon leader. The request can be received by a regional server, for example, implemented as a cloud server, edge server, micro cloud, etc. The regional server can execute a search for potential new leader vehicles within a region of the platoon.

Participating vehicles that may be available to provide a leadership service can be equipped to store information indicating experience levels in various types of situations. The regional server can identify one or more candidates from among the participating vehicles, rate the candidates (e.g., according to experience and current location) and select a new leader for the platoon based on the ratings. The regional server can coordinate a rendezvous between the platoon and the new leader and integrate the new leader into the platoon in the lead position. The new leader can proceed to guide the platoon through the situational area and either remain as a part of the platoon or depart after traversing the situational area. The regional server can maintain a profile for the new leader to track leadership performance and situational experience to inform future matching selections.

Figure 1:
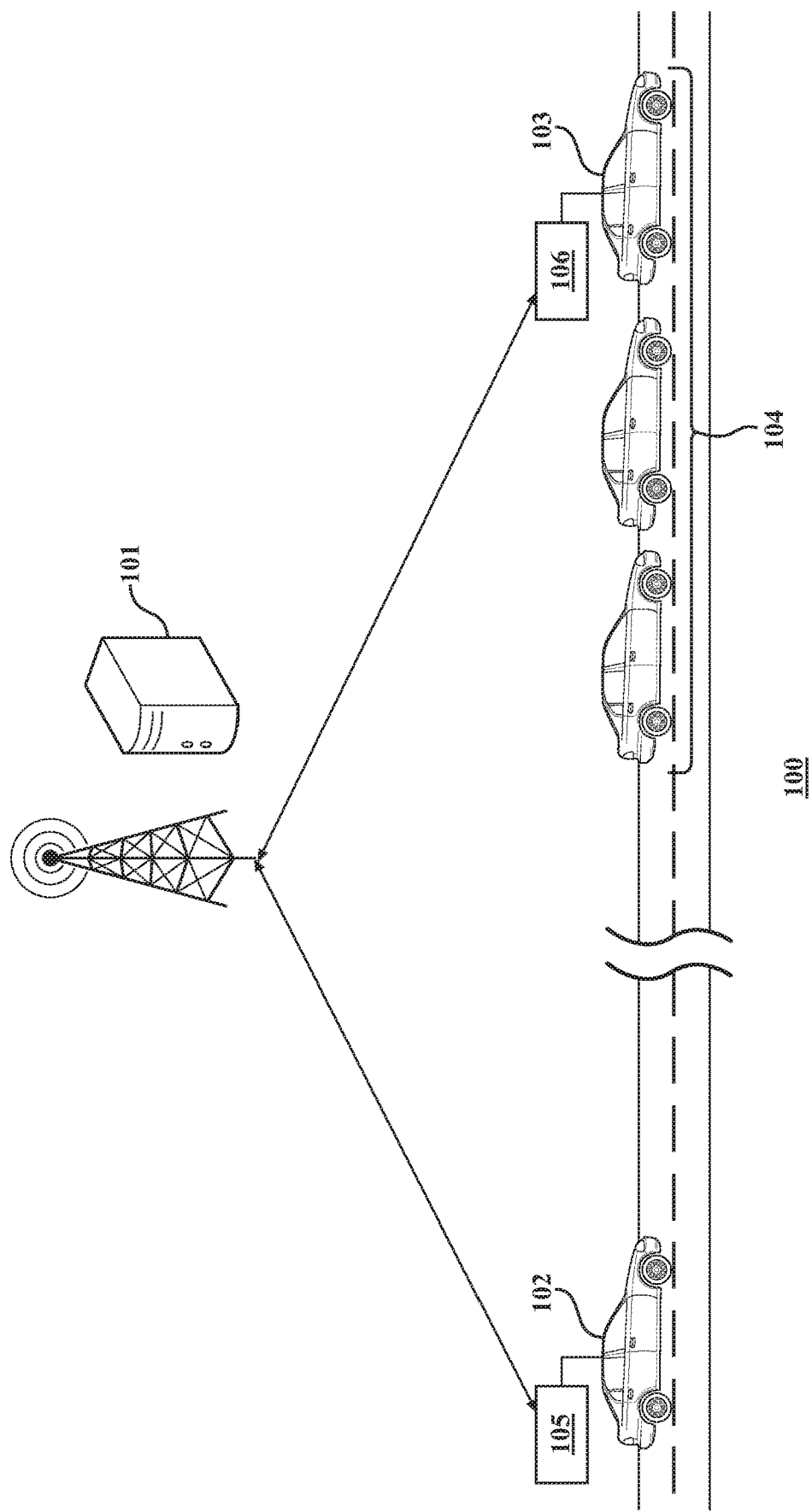
FIG. 1 illustrates one embodiment of a leader-as-a-service system, according to the disclosed embodiments.

Referring to FIG. 1, the disclosed leader-as-a-service system 100 can include a regional server 101 that can communicate with a vehicle 102, which may be a leader candidate, and a platoon leader vehicle 103 of a platoon 104. For example, in or more embodiments the leader-as-a-service system 100 can communicate with an onboard unit 105 of the vehicle 102 and an onboard unit 106 of the platoon leader vehicle 103.

Figure 2:
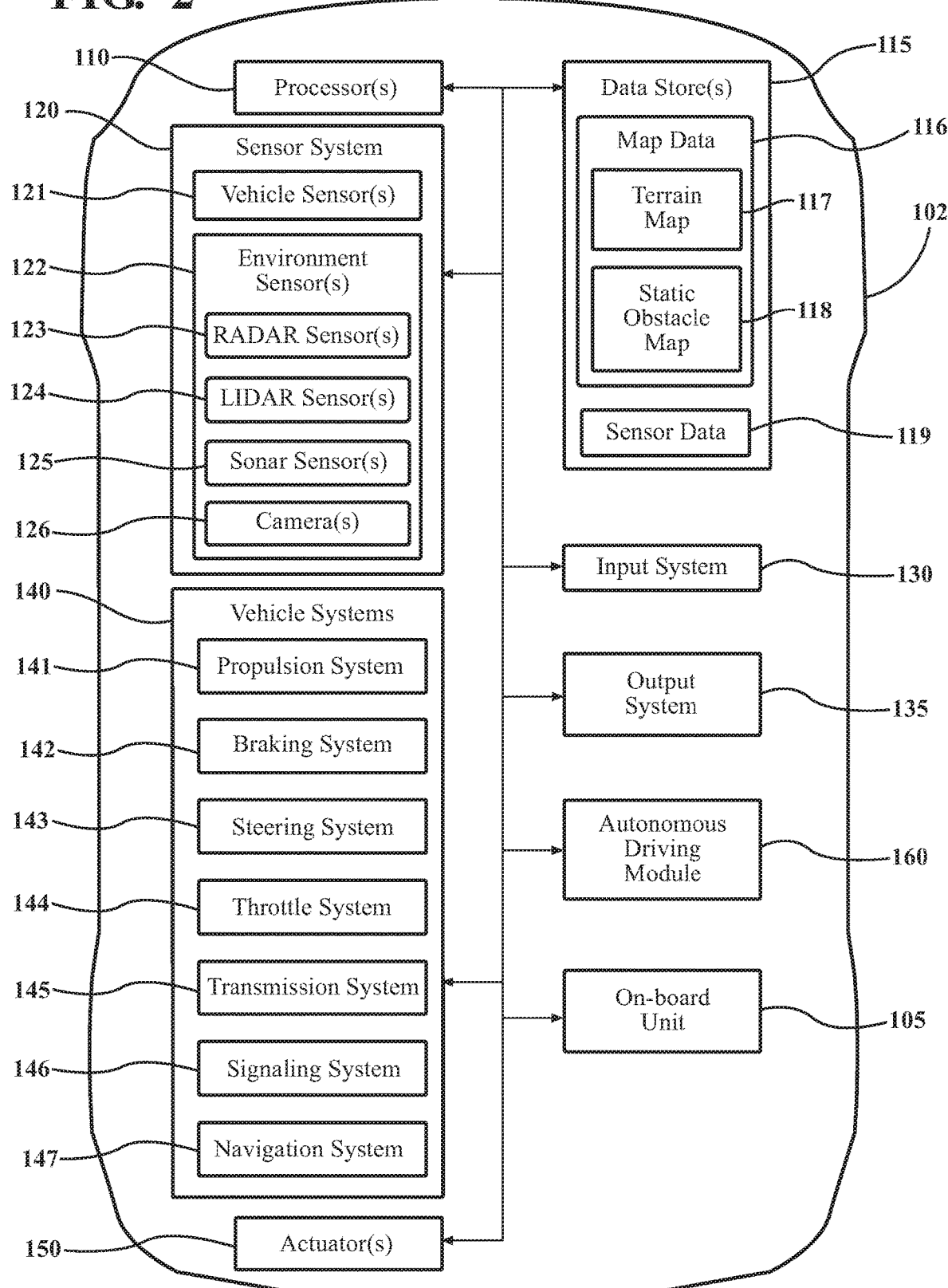
FIG. 2 illustrates one embodiment of a vehicle, according to the disclosed embodiments.

FIG. 2 shows an example of a vehicle 102, which can implement the leader candidate vehicle. For purposes of illustration and brevity the vehicle 102 may also be considered as an example vehicle capable of implementing the platoon leader vehicle 103 or other vehicles of the platoon 104, although it should be understood that minor variances may exist among different implementations. As used herein, a "vehicle" is any form of powered transport. In one or more implementations, the vehicle 102 is a pod, an automobile, e.g., a hybrid/electric automobile, an autonomous/semi-autonomous automobile, a combination thereof, etc. While arrangements will be described herein with respect to automobiles, it will be understood that embodiments are not limited to automobiles. In some implementations, the vehicle 102 may be any form of powered transport that, for example, can participate in a platoon, and thus can benefit from the functionality discussed herein.

As shown in FIG. 2, the vehicle 102 can include multiple elements. It should be understood that in various embodiments it may not be necessary for the vehicle 102 to have all of the elements shown in FIG. 2. The vehicle 102 can have any combination of the various elements shown in FIG. 2. Further, the vehicle 102 can have additional elements to those shown in FIG. 2. In some arrangements, the vehicle 102 may be implemented without one or more of the elements shown in FIG. 2. While the various elements are shown as being located within the vehicle 102 in FIG. 2, it will be understood that one or more of these elements can be located external to the vehicle 102. Further, the elements shown may be physically separated by large distances.

Some of the possible elements of the vehicle 102 are shown in FIG. 2 and will be described along with subsequent figures. However, a more detailed description of many of the elements in FIG. 2 will be provided after the discussion of FIGS. 3-7 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 102 includes an onboard unit 105 that is implemented to perform methods and other functions as disclosed herein, for example, relating to tracking driving experience and providing platoon leadership as a service. The noted functions and methods will become more apparent in the following discussion of the figures.

Figures 3, 5:
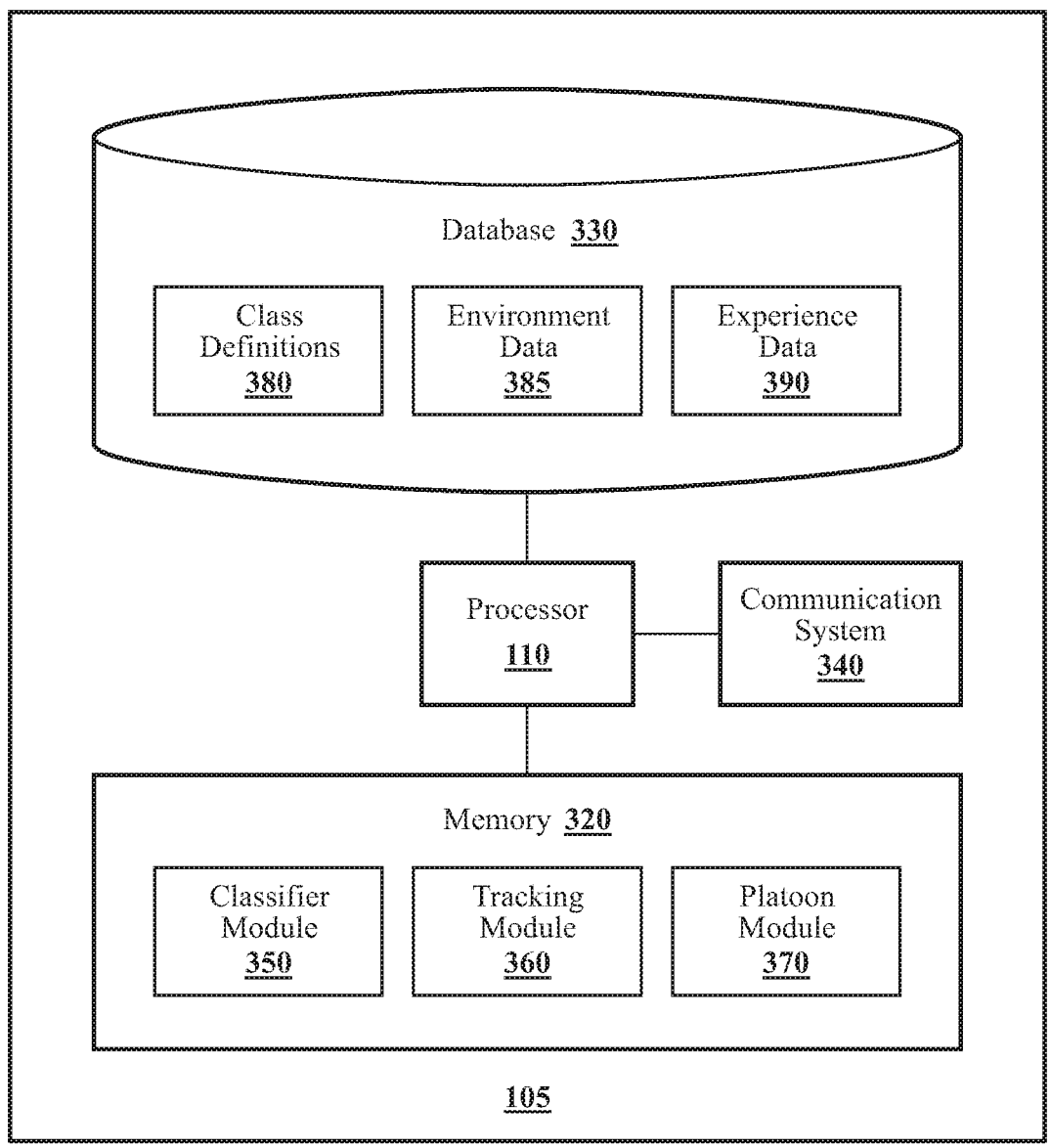
FIG. 3 illustrates one embodiment of an onboard unit, according to the disclosed embodiments.
FIG. 5 illustrates an example leader profile database, according to the disclosed embodiments.

FIG. 3 illustrates an example embodiment of the onboard unit 105 of FIG. 2. In one or more embodiments, the onboard unit 105 can be installed, for example, in an autonomous vehicle, semi-autonomous vehicle or manually operated vehicle. The onboard unit 105 is shown including a processor 110, a memory 320, database 330, and a communication system 340. In other embodiments more or fewer components than those shown can be included according to an implementation of the disclosed subject matter.

In one or more embodiments, the processor 110 may be a part of the onboard unit 105, or the onboard unit 105 may access the processor 110 through an in-vehicle connection (e.g., as shown in FIG. 2) or a network communication. The processor 110 may be one or more processors according to the processing power required or preferred per implementation.

The memory 320 can be implemented as a random-access memory (RAM), read-only memory (ROM), a hard-disk drive, a flash memory, or other suitable memory for storing, among other things, a classifier module 350, a tracking module 360 and a platoon module 370. The modules 350, 360 and 370 will be described further below.

The database 330 can store, among other information, class definition data 380, environment data 385 and experience data 390, which will be also described further below. The database 330 is, in one or more embodiments, an electronic data structure that can be a data store integral with the onboard unit 105, a removable memory device that can be installed in or removed from the onboard unit 105, or another network-based data store that is accessible to modules 350, 360 and 370 stored in the memory 320. In one or more embodiments the database 330 can be accessible to external systems, such as cloud or edge servers, micro cloud members, or road-side units. The database 330 is configured with routines that can be executed by the processor 110 for analyzing stored data, accessing and providing stored data, organizing stored data, and so on. Thus, in one embodiment, the database 330 stores and manages/updates data, such as class definition data 380, environment data 385 and experience data 390, as well as other types of data that are used by modules 350, 360 and 370 in executing various functions.

The communication system 340 can be implemented, for example, as a wireless communication system including one or more transmitting/receiving devices, one or more transmitting/receiving antennas and a controller for transmitting and receiving data over a wireless network using any of a variety of protocols, such as vehicle-to-vehicle (V2V), vehicle-to-everything (V2X), general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The communication system 340 can also include vehicle-to-cloud, vehicle-to-datacenter and any type of V2X communication protocol. In one or more embodiments, the communication system 340 can be configured to receive, for example, a search query for leader candidates from the server 101 and to transmit a response back to the server 101.

The modules 350, 360 and 370 can be, for example, constructed as computer-readable instructions that when executed by the processor 110 cause the processor 110 to perform the various functions disclosed herein.

The classifier module 350 generally includes instructions that function to control the processor 110 to determine a situation class for an environment the vehicle 102 is traveling through. In one or more embodiments the situation class can be a pre-defined event, such as entering a type of zone or area (e.g., a construction zone or school zone), a pre-defined driving condition, such as driving on a highway in inclement weather, or a pre-defined action, such as leading a platoon through a U-turn maneuver. In one or more embodiments, the classifier module 350 can weigh one or more contextual factors to identify a situation class. The contextual factors can include, for example, data from the navigation system 147 and map data 116 (FIG. 2) indicating a location of the vehicle 102, or sensor data 119 obtained from the vehicle sensor system 120 (FIG. 2) indicating aspects of an environment around the vehicle 102.

Parameters that define one or more situation classes can be stored as class definition data 380 in the database 330. A wide variety of situation classes may be represented in the class definition data 80. Example situation classes can include, for example, driving through a construction zone, driving in heavy traffic, driving on a highway during snowfall, leading a platoon through a detour, leading a platoon through inner city congestion, etc. It should be understood that the situation classes provided herein are examples and the disclosed subject matter is not limited to the situation classes listed here.

In one or more embodiments the classifier module 350 can identify and/or predict a pre-defined situation class based on a machine learning algorithm. For example, the classifier module 350 can obtain various types of information, such as navigation data, map data 116 and sensor data 119, etc., and process the obtained data to derive information, such as location, object detection, trajectory, platoon status, etc. The classifier module 350 can store the obtained data and the processed results as environment data 385. The machine learning algorithm can be trained to receive the environment data 385 as input and output a determined situation class based on the input.

The classifier module 350 is not limited to identifying pre-defined situation classes. In one or more embodiments, the classifier module 350 can include instructions to search for patterns in the environment data 385 in order to define and identify new, recurring situation classes that the vehicle 102 repeatedly encountered. The classifier module 350 can store parameters that define the new situation classes as new class definition data 380. Furthermore, in one or more embodiments the disclosed leader-as-a-service system 100 can receive updated situation class definitions from other sources, such as a cloud/edge server or other participating vehicles. The classifier module 350 can store such received updates as class definition data 380.

The tracking module 360 generally includes instructions that function to control the processor 110 to maintain an experience rating associated with each situation class represented in the class definition data 380 that the vehicle 102 has encountered. In one or more embodiments, the experience rating indicates an amount of experience the vehicle 102 has demonstrated in handling or negotiating the situation class. The tracking module 360 can store the experience rating(s) as experience data 390.

In one or more embodiments, the tracking module 360 can implement the experience rating as a counter that is incremented each time the vehicle 102 completes an instance of a situation class. As an illustration, for the example situation class "lead a platoon through a construction zone," each time the vehicle 102 completes an instance of the situation class, i.e., completes the task of leading a platoon through a construction zone, the tracking module 360 can increment the experience rating in the experience data 390 associated with the situation class. As another illustration, for the example situation class "lead a platoon along a highway at night during a storm," each time the vehicle 102 completes an instance of the situation class the tracking module 360 can increment the experience rating in the experience data 390 associated with the situation class. The disclosed embodiments are not limited to the tracking experience in the example class situations listed herein and can include tracking experience in platoon maneuvers such as split, merge, merge on ramp, merge on highway, etc.

The platoon module 370 generally includes instructions that function to control the processor 110 to execute platoon-related actions and maneuvers when the vehicle 102 is selected as a platoon leader. For example, operating as a platoon leader may require extra decision-making and execution capabilities regarding platoon-related dynamics, such as how to perform platooning maneuvers, detect untrusted and/or misbehaving platoon members, evict the untrusted and/or misbehaving platoon members, etc.

Accordingly, over time the experience data 390 may reflect varying levels of experience in the vehicle 102 handling various situation classes. As will be discussed below, based at least in part on the experience data 390, the vehicle 102 may be selected to operate as a platoon leader by a regional server 101 of the disclosed leader-as-a-service system 100.

Figure 4:
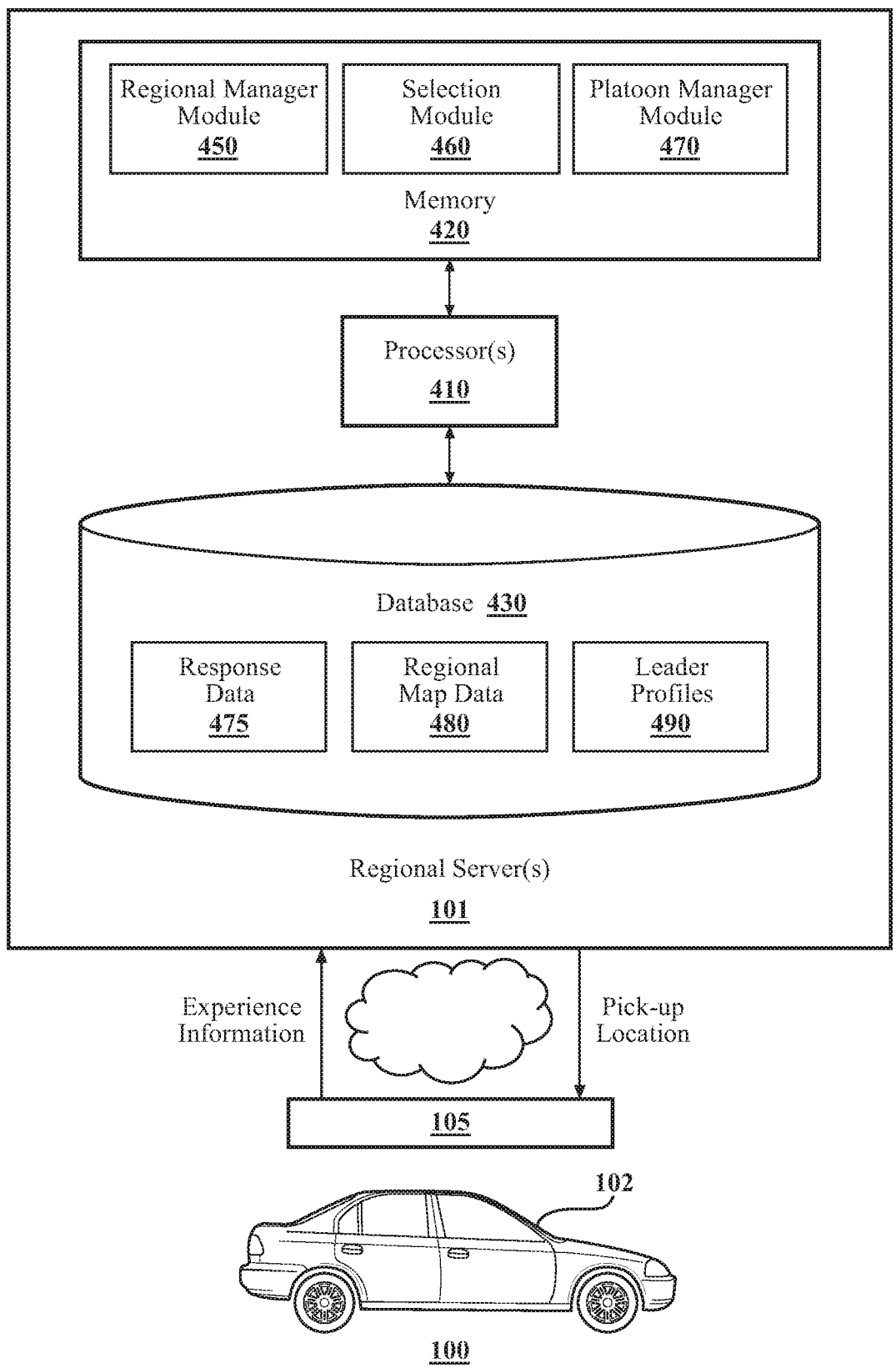
FIG. 4 illustrate one embodiment of a regional server, according to the disclosed embodiments.

FIG. 4 shows an example embodiment of the regional server 101. The server 101 can be implemented, for example, as a central server, a cloud server, an edge server, a cloud-based computing device, a micro cloud, or other network-connected computing device that can communicate with one or more external devices, or a group of connected devices (e.g., road-side units, stationary vehicles, etc.).

The regional server 101 is shown including one or more processors 410, a memory 420, and database 430. In other embodiments, more or fewer components than those shown can be included according to an implementation of the disclosed subject matter. Generally, the regional server 101 can be constructed, for example, as one or more network servers, particularly Internet accessible servers, including network interface circuitry configured to connect the processor(s) 410 to the network, such as the Internet or a cellular telephone network.

The memory 420 can be implemented as a random-access memory (RAM), read-only memory (ROM), a hard-disk drive, a flash memory, or other suitable memory for storing, among other things, a regional manager module 450, a selection module 460 and a platoon manager module 470. The modules 450, 460 and 470 will be described further below.

The database 430 can store, among other information, response data 475, regional map data 480, and leader profiles 490, which will be also described further below. The database 430 is, in one or more embodiments, an electronic data structure that can be a data store. The database 430 is configured with routines that can be executed by the processor 410 for analyzing stored data, accessing and providing stored data, organizing stored data, and so on. Thus, in one embodiment, the database 430 stores and manages/updates data, such as response data 475, regional map data 480, and leader profiles 490, as well as other types of data that are used by modules 450, 460 and 470 in executing various functions.

The regional manager module 450 generally includes instructions that function to control the processor(s) 410 to receive, from a platoon, a request for a platoon leader. The request can indicate a current location of the platoon and a situation class that the platoon is approaching. The regional manager module 450 can further include instructions to broadcast a search query for a vehicle having experience in handling the situation class indicated in the request.

For example, in one or more embodiments the regional manager module 450 can defining a region containing the location of the platoon and/or the area exhibiting the situation class and broadcast the search query to one or more vehicles located within the region. In one implementation the regional manager module 450 can transmit the search query to one or more nodes (e.g., road-side units, edge servers, micro clouds, etc.) that are in the platoon or in a vicinity of the platoon location or the defined region. The search query can include information indicating the situation class that the platoon is approaching. The node(s) can broadcast the request to one or more vehicles in a locality of the node(s). The one or more vehicles may include one or more potential leader vehicles that have experience in handling the situation class.

One or more vehicles (i.e., potential leader vehicles) may respond to the search query. The selection module 460 generally includes instructions that function to control the processor(s) 410 to receive, from a responding vehicle, a response to the search query. The response can indicate, for example, an experience level of the responding vehicle and a location of the responding vehicle. The selection module 460 can select the responding vehicle as a new leader based at least in part on the response.

In one or more embodiments, the selection module 460 can determine a match score for each responding vehicle based at least in part on the corresponding experience level and the corresponding current location. The match score can indicate, for example, a matching strength between the responding vehicle and the platoon. For example, in one or more embodiments the selection module 460 can determine a matching score S for a responding vehicle according to the formula:

$$S=(w1)E+(w2)D \qquad \text{Eq. 1}$$

where E is the experience rating of the responding vehicle regarding the situation class, D is a distance between the responding vehicle and the platoon, and w1 and w2 are adjustable weight values. The weight values w1 and w2 can be adjusted, for example, to indicate a preference for closer vehicles or a preference for more experienced vehicles. However, it should be understood that Eq. 1 is merely one example formula for determining a matching score. Different implementations of the disclosed subject matter can employ different formulas for determining a matching score or equivalent rating value for a responding vehicle. For example, in one or more embodiments the selection module 460 can include other parameters, such as a platoon member parameter:

$$S=(w1)E+(w2)D+(w3)P \qquad \text{Eq. 2}$$

where P is a parameter indicating whether the responding vehicle is currently a member of the platoon. The selection module 460 can implement a bias for selecting current platoon members by increasing the w3 weight value.

The selection module 460 can select a vehicle from among a plurality of responding vehicles as a new leader based on the match score associated with the selected vehicle. For example, in one or more embodiments the selection module 460 can select the responding vehicle that has the best match score.

The platoon manager module 470 generally includes instructions that function to control the processor(s) 410 to assign the new leader to the platoon, coordinate a rendezvous between the new leader and the platoon when necessary, and cause the new leader to assume a lead position in the platoon. The platoon manager module 470 can further include instructions for simultaneously tracking a plurality of platoons, and planning routes of platoons by using origin and destination of platoon members based on predefined metrics such as minimum number of platoon maneuvers, shortest travel and/or maximum platoon lifetime. Accordingly, the platoon manager module can provide instructions for platooning maneuvers as well as for navigating a platoon and new leader to meet each other at a determined pick-up location when necessary (i.e., when the new leader is not already a member of the platoon).

The pick-up location can be, for example, the current location of the platoon, a location along the current route of the platoon, the current location of the new leader, a location along the current route of the new leader, a location at a point between the platoon and the new leader, or another location. In one or more embodiments, the platoon manager module 470 can consider, for example, one or more of traffic flow and density, minimizing travel time for the platoon, minimizing travel time for the new leader, or other factors in determining the pick-up location.

In one or more embodiments, the response to the search query from the responding vehicle can include original destination information associated with the responding vehicle. Based on this information, the platoon manager module 470 can include instructions to coordinate the rendezvous between the selected new leader and the platoon by identifying a plurality of potential pick-up locations and selecting a pick-up location from among the plurality of potential pick-up locations that least increases an overall travel time of the new leader as a way to decrease inconvenience for the new leader.

In any case, after determining and transmitting the pick-up location to the platoon and new leader, the platoon manager module 470 can continue to correspond separately with the new leader and the platoon as the two approach the pick-up location. For example, the platoon manager module 470 can change or adjust the pick-up location if necessary. When both the new leader and the platoon arrive at the pick-up location, the platoon manager module 470 can transmit instructions to the new leader and the platoon to execute integration of the new leader and resumption of travel of the platoon, now following the new leader.

The platoon manager module 470 can determine a destination for the new leader to travel to. For example, in one or more embodiments the platoon manager module 470 can determine a short-term destination to which the new leader guides the platoon. Upon reaching the short-term destination, if the new leader was already a member of the platoon then the new leader can resume its original position and the platoon can proceed in its initial configuration. If the new leader was not a member of the platoon, then the new leader can exit the platoon to resume original travel towards its own destination. The short-term destination can be located, for example, at a location beyond the situation area such that the new leader guides the platoon through the area exhibiting the situation class. In one or more embodiments, the platoon manager module 470 can determine the short-term destination as the final destination of the platoon, for example, when the new leader originally intended to travel at least as far as the final destination or when the new leader consents to lead the platoon to the final destination.

In one or more embodiments, the platoon manager module 470 includes instructions to maintain a database that includes one or more leader profiles and associated leadership evaluation metrics. FIG. 5 shows an example database table 500. It should be understood that the database table 500 is merely an example provided for illustrative purposes to better facilitate understanding of the disclosed embodiments. Embodiments of the disclosed subject matter can include more or fewer attributes associated with the vehicle profiles, such as type of vehicle, contact information, times and/or locations of leadership service, number of vehicles served to date, duration of driving time spent as a leader, etc.

As shown, the database table 500 can store various attributes including, for example, a profile ID 510, a situation class code 520, a performance grade 530, and a situation count 540. In an example use case, after a new leader of a platoon has led the platoon beyond an area exhibiting a situation class the platoon manager module 470 can update the database table 500 to reflect the performance of the leader vehicle in handling the situation. For example, the platoon manager module 470 can assign the leader vehicle a profile ID 510, record the situation code, e.g., based on a situation class code 520, and record a performance grade 530 for the performance of the leader vehicle. In one or more embodiments the performance grade 530 can be based, for example, on a polling of follower vehicles in the platoon or on a formula based on aspects of the situation class. Furthermore, the platoon manager module 470 can increment a situation count 540 to indicate a number of times that the leader vehicle has functioned as a leader-as-a-service leader and handled the associated situation.

In one or more embodiments, the selection module 460 can select, in response to a leader request from a platoon, the responding vehicle as the new leader based at least in part on profile information stored in the database table 500 associated with the responding vehicle.

Figure 6:
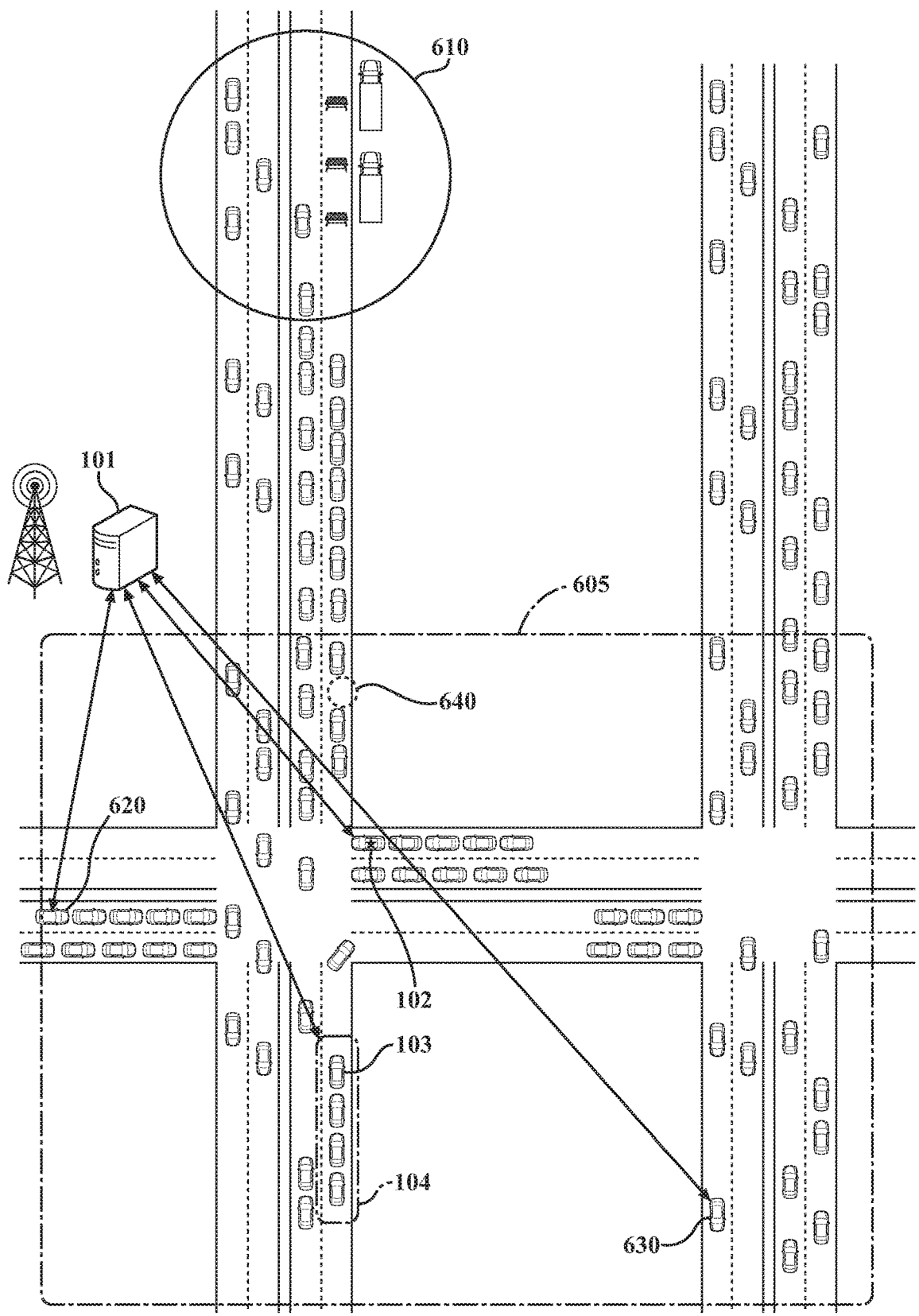
FIG. 6 illustrates an example scene in which the disclosed embodiments may be applied.

FIG. 6 shows an example scene 600 in which the disclosed embodiments may be applied. In the example scene 600, a vehicle platoon 104 is approaching a situation area 610 (e.g., a construction zone) that the current platoon leader 103 has no experience in leading a platoon through. The current platoon leader 103 sends a request for a new platoon leader to the regional server 101. The request can include the current location and current destination of the platoon, and information indicating the situation class that the platoon 104 is requesting aid in traversing.

In response, the regional server 101 defines a region 605 based on the location of the platoon 104 and broadcasts a search query to vehicles in the region 605. The search query can include, for example, information indicating the situation class that the platoon 104 is seeking a leader for aid in traversing.

Multiple vehicles (e.g., the vehicle 620, the vehicle 630 and the vehicle 102) may respond affirmatively to the search query. Each of the vehicles 620, 630, 102 can be equipped and/or configured to track experience in handling various situation classes. Accordingly, each response sent from the vehicles 620, 630, 102 can include information indicating an experience level of the vehicle that sent the response in regard to handling the situation referenced in the search query, as well as information indicating a current location and a current destination of the respective vehicle.

The regional server 101 can receive and store the responses as response data 475 in database 430 (FIG. 4). The regional server 101 can process the response data 475 and determine a match score for each vehicle 620, 630, 102. In one or more embodiments, the regional server 101 can determine whether a profile exists for each vehicle 620, 630, 102 in stored leader profile data 490. If a profile exists for a responding vehicle and includes information about the vehicle's performance in handling the situation class of the situation area 610, the regional server 101 can adjust the match score for the vehicle based on the profile information.

Based at least in part on the determined match scores, the regional server 101 can select a vehicle (e.g., vehicle 102) as the new leader for the platoon 104. For example, the regional server 101 can determine that vehicle 102 has the best match score (e.g., best combination of experience level, profile rating, current route, and proximity to platoon 104) compared to vehicles 620 and 630.

The regional server 101 can analyze regional map data 480 to determine a pick-up location 640 for the platoon 104 and the new leader 102. The regional server 101 can coordinate a rendezvous between the platoon 104 and the new leader 102 and transmit instructions for integrating the new leader 102 into the platoon 104 as the platoon leader.

The regional server 101 can further analyze the regional map data 480 to determine a short-term destination for the platoon 104 under the leadership of the new leader 102. The short-term destination may be a location beyond the situation area 610. In some circumstances, the final destination of the platoon 104 can be set as the short-term destination. After the new leader 102 has guided the platoon 104 past the situation area 610 and arrived at the short-term destination, the new leader 102 can exit the platoon. The regional server 101 can obtain information associated with the performance of the new leader 102 and store the information as part of a profile of the new leader 102, e.g., as leader profile data 490 in the database 430. For example, the regional server 101 can poll the follower vehicles of the platoon 104 requesting an evaluation of the new leader's 102 performance leading the platoon 104 past the situation area 610.

Thus, the disclosed leader-as-a-service system 100 can receive a request for a leader from a platoon approaching a problematic or difficult situation, locate a new leader that is experienced in handling the situation, orchestrate a meeting and integration of the new leader with the platoon, and provide appropriate guidance as to how far the new leader should lead the platoon, taking into account the already existing route/plans of the new leader.

Although the above-discussed example describes a platoon approaching a specific situation area, the disclosed subject matter is not limited to a proximal or geographic situation. For example, in one or more implementations the situation that prompts the platoon to request a new leader may be a difficult maneuver for a platoon to execute, such as a U-turn or detour. Furthermore, although the above-discussed example describes the regional server 101 receiving responses from vehicles within the defined region 605, the disclosed subject matter is not limited to a single region search. In one or more embodiments, the regional server 101 can define multiple regions to search for potential new leaders. For example, if the regional server 101 does not receive a response from a first region within a threshold time the regional server 101 can define one or more additional regions to search for potential new leader.

Thus, the disclosed leader-as-a-service system 100 can provide an automated service that improves platoon navigation providing, integrating, and instructing new leaders into platoons on-demand and having experience to resolve the immediate problems platoons are facing.

Figure 7:
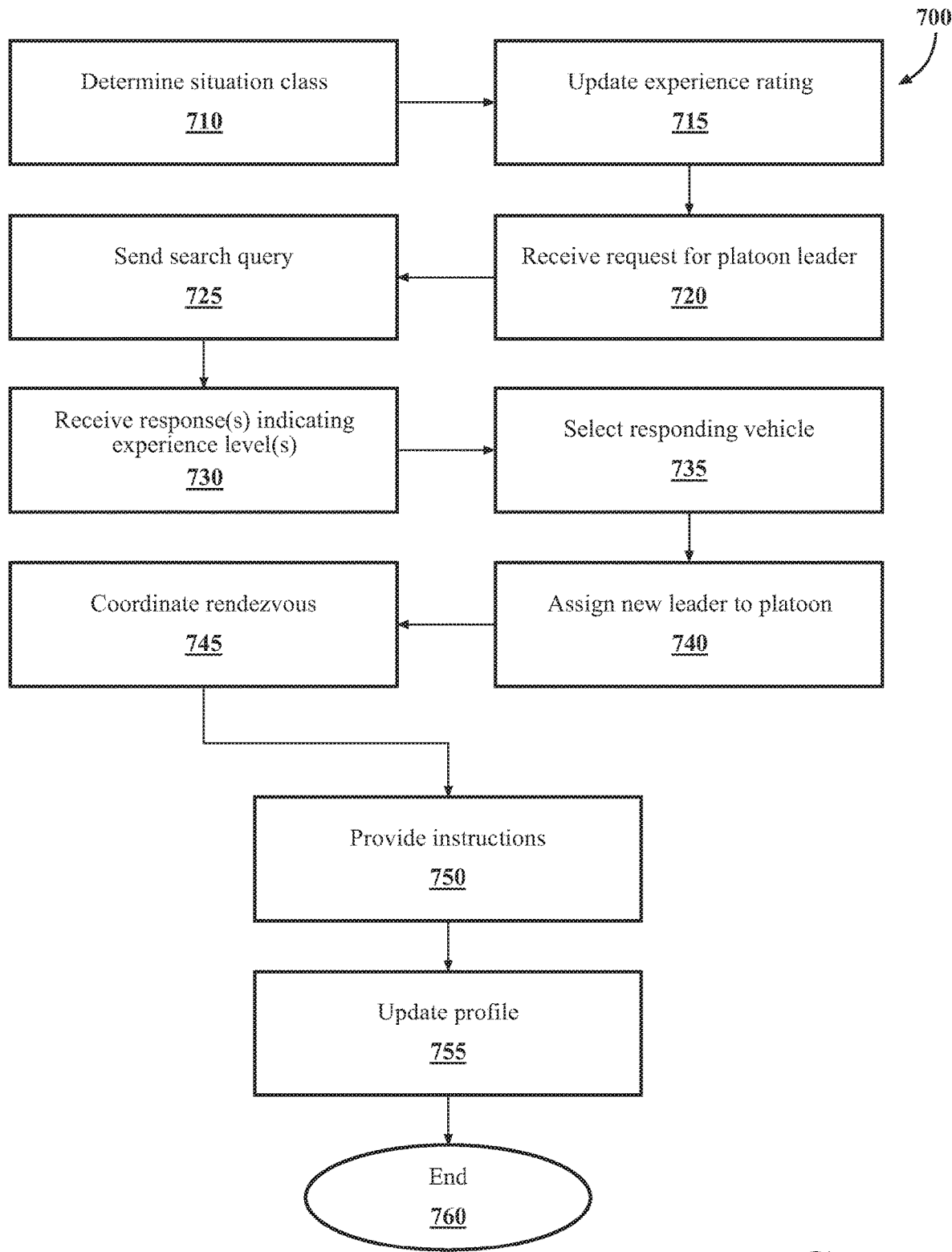
FIG. 7 illustrates a flowchart of a method of providing leadership as a service, according to the disclosed embodiments.

FIG. 7 illustrates a flowchart of a method 700 of creating and utilizing one or more vehicular micro clouds to assist in navigation past a traffic event according to the disclosed embodiments. Method 700 will be discussed from the perspective of the leader-as-a-service system 100 of FIG. 1. While method 700 is discussed in combination with the leader-as-a-service system 100, it should be understood that the method 700 is not limited to implementation within the leader-as-a-service system 100, which is merely one example of a system that may implement the method 700. It should further be understood that the order of operations can change in various implementations of the method 700.

At operation 710, a vehicle 102 participating in the leader-as-a-service system 100 (e.g., classifier module 350 of onboard unit 105, FIG. 3) determines a situation class for an environment the vehicle 102 is traveling through or a maneuver that the vehicle 102 is completing. In one or more embodiments, the vehicle 102 can be an autonomous vehicle. In one or more embodiments, the vehicle 102 can be a semi-autonomous or manual operation vehicle.

The situation can be, for example, a particular type of zone or area (e.g., construction zone, school zone, accident area, high congestion area, flood area, heavy snow highway, etc.) or a particular type of maneuver (e.g., leading a platoon through a U-turn or detour), or be a situation that requires special equipment, high quality sensors, or the like. In one or more embodiments, the classifier module 350 can analyze one or more different types of environment data 385 (e.g., data obtained from environment sensor 122, vehicle systems 140, or from a source external to the vehicle 102) to identify whether the environment data 385 indicate a situation class defined in class definitions 380.

At operation 715, the vehicle 102 (e.g., tracking module 360 of onboard unit 105, FIG. 3) updates an experience rating associated with the situation class. The experience rating can indicate an amount of experience the vehicle 102 has in handling the situation class. For example, in one or more embodiments the experience rating can be based on a number of miles the vehicle 102 has driven in an environment exhibiting the situation class, how many times the vehicle 12 has traversed the situation or completed the situation maneuver, etc.

At operation 720, a regional server 101 of the disclosed leader-as-a-service system 100 (e.g., regional manager module 450, FIG. 4) can receive, from a platoon, a request for a platoon leader. The request can indicate a location of the platoon and a situation class that the platoon is seeking help in surpassing. In one or more embodiments, the regional manager module 450 can first perform a preliminary search for a nearby existing platoon that is already prepared to surpass the situation class (e.g., has not expressed a need for a new leader). If an existing platoon is found, the regional manager module 450 can attempt to join the requesting platoon with the existing platoon. If no existing platoon is found or the attempt to join the two platoons is unfeasible, the process continues to operation 725.

At operation 725, the regional manager module 450 can broadcast a search query for a vehicle having experience in handling the situation class. For example, the regional manager module 450 can define a region based at least in part on the location of the platoon (e.g., a ten-mile radius, fifteen-mile radius, etc.). In one or more embodiments the regional manager module 450 can transmit the search query to one or more of nodes (e.g., secondary server, cloud server, edge server, road-side unit, vehicular micro cloud, etc.) within the region along with a request for the one or more nodes to broadcast the search query to vehicles in a vicinity of the one or more nodes. In one or more embodiments the regional manager module 450 can maintain a database of leader profiles 490 and can directly broadcast the search query to participating vehicles configured to receive the search query and having associated profiles stored in the leader profiles 490.

At operation 730, the regional server 101 of the disclosed leader-as-a-service system 100 (e.g., selection module 460, FIG. 4) can receive, from a responding vehicle, a response to the search query with the response indicating an experience level. In one or more embodiments, the selection module 460 can receive multiple responses that each indicate a corresponding experience level and a corresponding current location of a corresponding vehicle. The responses may be received, for example, from vehicles that are currently traveling solo in the region, currently leading a platoon in the region, or currently stationary in the region and preparing to travel.

At operation 735, the selection module 460 can select a responding vehicle as a new leader for the platoon based at least in part on the received response. For example, in one or more embodiments the selection module 460 can determine a match score for each vehicle that provided a response to the search query. The selection module 460 can determine each match score based at least in part on the experience level and the current location of each corresponding vehicle. In one or more embodiments, the selection module 460 can further adjust the match score of a vehicle based at least in part on information in the leader profiles 490 that is associated with the vehicle. The selection module 460 can select a responding vehicle to be the new leader for the platoon based on the match score associated with the responding vehicle.

At operation 740, the regional server 101 of the disclosed leader-as-a-service system 100 (e.g., platoon manager module 470, FIG. 4) can assign the new leader to the platoon. For example, the platoon manager module 470 can transmit, to the platoon members and current leader, identification information associated with the new leader, and vice versa.

At operation 745, the platoon manager module 470 can coordinate a rendezvous between the new leader and the platoon. For example, in one or more embodiments the platoon module 470 can identifying a plurality of potential pick-up locations based on regional map data 480. The platoon manager module 470 can select a pick-up location, from among the plurality of potential pick-up locations, that least increases a travel time of the new leader. For example, the platoon module 470 can select a pick-up location that is along or close to a current route of the new leader.

At operation 750, the platoon manager module 470 can provide instructions to the new leader that cause the new leader to join the platoon (i.e., assume a driving position at the front of the platoon) upon meeting the platoon at the pick-up location and proceed to lead the platoon through an area exhibiting the situation class. For example, in one or more embodiments the platoon manager module 470 can determine a short-term destination for the new leader to lead the platoon to. In one or more embodiments, the short-term destination can be a location beyond the area exhibiting the situation class that is one or more of: a location along the route of the new leader, a location along the route of the platoon, a final destination of the platoon, a location immediately beyond the area exhibiting the situation class relatively near the area exhibiting the situation class, or a different location.

At operation 755, after the new leader has led the platoon beyond the area exhibiting the situation class the selection module 460 can create or identify a leader profile associated with the new leader and update leadership evaluation metrics associated with the leader profile based on the performance of the new leader. For example, in one or more embodiments if the new leader successfully leads the platoon beyond the area exhibiting the situation class, the selection module 460 can increment a metric value of the leader profile associated with the situation class. In one or more embodiments the selection module 460 can transmit a polling message to members of the platoon requesting an evaluation of the new leader's performance, determine a grade or rating based on responses to the polling message, and update the profile based on the determined grade or rating.

At operation 760, the assignment is complete, the new leader exits the platoon, and the method ends. However, it should be understood that the method can be dynamically applied and thus initiated at any time as needed, even by a platoon that has already benefited from a new leader assignment. For example, a platoon may receive a new leader via the disclosed leader-as-a-service system 100, surpass one situation class area, and subsequently encounter a second situation class that the new leader does not have experience in. In this case, the method may begin again at operation 710, i.e., the platoon can once again transmit a request to the regional server 101 for another new leader having experience traversing the second situation class, etc.

Thus, as described above the disclosed leader-as-a-service system 100 can not only dynamically respond to a specific request from a platoon for aid in surpassing a specific challenge, the system 100 can also track the performance abilities of platoon leader vehicles that are deployed by the system 100 and use such information to better inform future leadership assignments. In this manner the disclosed leader-as-a-service system 100 can continually self-improve with respect to matching proven, experienced leaders with platoons in situations in which the experienced leaders have demonstrated high capability.

As discussed above, the leader-as-a-service system 100 can include one or more modules, at least some of which are described herein. The modules can be implemented as computer-readable program code that, when executed by a processor 110 (and/or processor 410), implement one or more of the various processes described herein. One or more of the modules can be a component of the processor(s) 110/410, or one or more of the modules can be executed on and/or distributed among other processing systems to which the processor(s) 110/410 is operatively connected. The modules can include instructions (e.g., program logic) executable by one or more processor(s) 110/410. Alternatively, or in addition, one or more data stores of the leader-as-a-service system (e.g., database 330) may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

FIG. 2 will now be discussed in full detail as an example environment within which the system and methods disclosed herein may operate. In some instances, the vehicle 102 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 102 can be a conventional vehicle that is configured to operate in either an autonomous mode or a manual mode.

As previously discussed, in one or more embodiments the vehicle 102 is an autonomous vehicle. As used herein, "autonomous vehicle" refers to a vehicle that operates and executes various driving functions autonomously. More specifically, "autonomous mode" refers to navigating and/or maneuvering the vehicle 102 along a travel route using one or more computing systems to control the vehicle 102 with minimal or no input from a human driver. In one or more embodiments, the vehicle 102 is highly automated or completely automated. In one embodiment, the vehicle 102 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 102 along a travel route.

The vehicle 102 can include one or more processors 110. In one or more arrangements, the processor(s) 110 can be a main processor of the vehicle 102. For instance, the processor(s) 110 can be an electronic control unit (ECU). The vehicle 102 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can store sensor data 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 102 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 102 (including any of the elements shown in FIG. 2). The sensor system 120 can acquire data of at least a portion of the external environment of the vehicle 102 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 102 itself. In one or more arrangements, the vehicle sensor(s) 121 can be configured to detect, and/or sense position and orientation changes of the vehicle 102, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 102. In one or more arrangements, the vehicle sensor(s) 121 can include a speedometer to determine a current speed of the vehicle 102.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 102 and/or information/data about such obstacles. Such obstacles may be stationary objects and/or dynamic objects. The one or more environment sensors 122 can be configured to detect, measure, quantify and/or sense other things in the external environment of the vehicle 102, such as, for example, lane markers, signs, traffic lights, traffic signs, lane lines, crosswalks, curbs proximate the vehicle 102, pedestrians, bicyclists, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 102 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 102 can include an output system 135. An "output system" includes any device, component, or arrangement or groups thereof that enable information/data to be presented to a vehicle passenger (e.g., a person, a vehicle passenger, etc.).

The vehicle 102 can include one or more vehicle systems 140. Various examples of the one or more vehicle systems 140 are shown in FIG. 2. However, the vehicle 102 can include more, fewer, or different vehicle systems. It should be appreciated that although particular vehicle systems are separately defined, each or any of the systems or portions thereof may be otherwise combined or segregated via hardware and/or software within the vehicle 102. The vehicle 102 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 102 and/or to determine a travel route for the vehicle 102. The navigation system 147 can include one or more mapping applications to determine a travel route for the vehicle 102. The navigation system 147 can include a global positioning system, a local positioning system or a geolocation system.

The vehicle 102 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 102 can include one or more autonomous driving modules 160. The autonomous driving module(s) 160 can be configured to receive data from the sensor system 120 and/or any other type of system capable of capturing information relating to the vehicle 102 and/or the external environment of the vehicle 102. In one or more arrangements, the autonomous driving module(s) 160 can use such data to generate one or more driving scene models. The autonomous driving module(s) 160 can determine position and velocity of the vehicle 102. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 102 for use by the processor(s) 110, and/or one or more of the modules described herein to estimate position and orientation of the vehicle 102, vehicle position in global coordinates based on signals from a plurality of satellites, or any other data and/or signals that could be used to determine the current state of the vehicle 102 or determine the position of the vehicle 102 with respect to its environment for use in either creating a map or determining the position of the vehicle 102 in respect to map data.

The autonomous driving module(s) 160 can be configured to determine trajectory plans and travel path(s) and determine current autonomous driving maneuvers for the vehicle 102, future autonomous driving maneuvers and/or modifications to current autonomous driving maneuvers based on data acquired by the sensor system, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 102, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 102 or one or more systems thereof (e.g., one or more of vehicle systems 140).

The processor(s) 110 and/or the autonomous driving module(s) 160 can be operatively connected to communicate with the various vehicle systems 140 and/or individual components thereof. For example, returning to FIG. 2, the processor(s) 110 and/or the autonomous driving module(s) 160 can be in communication to send and/or receive information from the various vehicle systems 140 to determine/set a trajectory plan and/or control the movement, speed, maneuvering, heading, direction, etc. of the vehicle 102. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 102 by controlling one or more of the vehicle systems 140 and/or components thereof. For instance, when operating in an autonomous mode, the processor(s) 110 and/or the autonomous driving module(s) 160 can control the direction and/or speed of the vehicle 102, e.g., to move toward an optimal alignment position. The processor(s) 110 and/or the autonomous driving module(s) 160 can cause the vehicle 102 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 102 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for providing platoon leadership as a service, comprising:
    one or more processors; and
    a memory communicably coupled to the one or more processors and storing:
        a first set of instructions that when executed by the one or more processors cause the one or more processors to receive, from a platoon, a request for a platoon leader, the request indicating a location and a situation class, and to send out a search query requesting a vehicle having experience in handling the situation class;
        a second set of instructions that when executed by the one or more processors cause the one or more processors to receive, from a responding vehicle, a response to the search query, the response indicating an experience level in handling the situation class, and to select the responding vehicle as a new leader based at least in part on the response; and
        a third set of instructions that when executed by the one or more processors cause the one or more processors to assign the new leader to the platoon and to provide instructions to the new leader that cause the new leader to assume a lead position in the platoon and lead the platoon through an area exhibiting the situation class.

2. The system of claim 1, wherein the first set of instructions further includes instructions to:
    define a region containing the location of the platoon; and
    broadcast the search query to one or more vehicles located within the region.

3. The system of claim 1, wherein:
    the instructions to receive the response include instructions to receive a plurality of responses, a response, of the plurality of responses, indicating a corresponding experience level and a corresponding current location of a corresponding vehicle, and
    the second set of instructions further includes instructions to:
        determine a match score for the corresponding vehicle based at least in part on the corresponding experience level and the corresponding current location, and
        select the responding vehicle, from among the plurality of vehicles, as a new leader based on a match score associated with the responding vehicle.

4. The system of claim 1, wherein:
    the second set of instructions further includes instructions to:
        maintain a database that includes one or more leader profiles and associated leadership evaluation metrics; and
        update the database based on a performance of a leader vehicle after an assignment; and
    the instructions to select the responding vehicle include instructions to select the responding vehicle as the new leader based at least in part on information stored in the database associated with the responding vehicle.

5. The system of claim 1, wherein the response to the search query from the responding vehicle includes destination information associated with the responding vehicle, and the third set of instructions further includes instructions to coordinate a rendezvous between the new leader and the platoon by identifying a plurality of potential pick-up locations and selecting a pick-up location, from among the plurality of potential pick-up locations, that least increases a travel time of the responding vehicle.

6. A method for providing platoon leadership as a service, comprising:
    receiving, from a platoon, a request for a platoon leader, the request indicating a location and a situation class;
    sending out a search query for a vehicle having experience in handling the situation class;
    receiving, from a responding vehicle, a response to the search query, the response indicating an experience level in handling the situation class;
    selecting the responding vehicle as a new leader based at least in part on the response;
    assigning the new leader to the platoon; and
    providing instructions to the new leader that cause the new leader to assume a lead position in the platoon and lead the platoon through an area exhibiting the situation class.

7. The method of claim 6, wherein the sending out the search query comprises:
    defining a region containing the location of the platoon; and
    broadcasting the search query to one or more vehicles located within the region.

8. The method of claim 6:
    wherein the receiving the response to the search query comprises receiving a plurality of responses, a response, of the plurality of responses, indicating a corresponding experience level and a corresponding current location of a corresponding vehicle, and further comprising:
  determining a match score for the corresponding vehicle based at least in part on the corresponding experience level and the corresponding current location; and
  selecting the responding vehicle, from among the plurality of vehicles, as a new leader based on a match score associated with the responding vehicle.

9. The method of claim 6, further comprising:
  maintaining a database that includes one or more leader profiles and associated leadership evaluation metrics;
  updating the database based on a performance of a leader vehicle after an assignment; and
  the selecting the responding vehicle comprises selecting the responding vehicle as the new leader based at least in part on information stored in the database associated with the responding vehicle.

10. The method of claim 6, wherein the response to the search query from the responding vehicle includes destination information associated with the responding vehicle, the method further comprising:
  coordinating a rendezvous between the new leader and the platoon by identifying a plurality of potential pick-up locations; and
  selecting a pick-up location, from among the plurality of potential pick-up locations, that least increases a travel time of the responding vehicle.

11. A system for providing platoon leadership as a service, comprising:
  an onboard unit of a responding vehicle, including:
    a first set of one or more processors; and
    a first memory communicably coupled to the first set of one or more processors and storing:
      a first set of instructions that when executed by the first set of one or more processors cause the first set of one or more processors to determine or predict a situation class for an environment the responding vehicle is traveling through; and
      a second set of instructions that when executed by the first set of one or more processors cause the first set of one or more processors to maintain an experience rating associated with the situation class, the experience rating indicating an amount of experience the responding vehicle has in handling the situation class; and
  a server, including:
    a second set of one or more processors; and
    a second memory communicably coupled to the second set of one or more processors and storing:
      a third set of instructions that when executed by the second set of one or more processors cause the second set of one or more processors to receive, from a platoon, a request for a platoon leader, the request indicating a location and the situation class, and to broadcast a search query for a vehicle having experience in handling the situation class;
      a fourth set of instructions that when executed by the second set of one or more processors cause the second set of one or more processors to receive, from the responding vehicle, a response to the search query with the response indicating an experience level, and to select the responding vehicle as a new leader based at least in part on the response; and
      a fifth set of instructions that when executed by the second set of one or more processors cause the second set of one or more processors to assign the new leader to the platoon and to provide instructions to the new leader that cause the new leader to assume a lead position in the platoon and lead the platoon through an area exhibiting the situation class.

12. The system of claim 11, wherein the third set of instructions further includes instructions to:
  define a region containing the location of the platoon; and
  broadcast the search query to one or more vehicles located within the region.

13. The system of claim 11, wherein:
  the instructions to receive the response include instructions to receive a plurality of responses that each indicate responses, a response, of the plurality of responses, indicating a corresponding experience level and a corresponding current location of a corresponding vehicle, and
  the fourth set of instructions further includes instructions to:
    determine a match score for the corresponding vehicle based at least in part on the corresponding experience level and the corresponding current location, and
    select the responding vehicle, from among the plurality of vehicles, as a new leader based on a match score associated with the responding vehicle.

14. The system of claim 11, wherein:
  the fourth set of instructions further includes instructions to:
    maintain a database that includes one or more leader profiles and associated leadership evaluation metrics; and
    update the database based on a performance of a leader vehicle after an assignment; and
  the instructions to select the responding vehicle include instructions to select the responding vehicle as the new leader based at least in part on information stored in the database associated with the responding vehicle.

15. The system of claim 11, wherein the response to the search query from the responding vehicle includes destination information associated with the responding vehicle, and the fifth set of instructions further includes instructions to coordinate a rendezvous between the new leader and the platoon by identifying a plurality of potential pick-up locations and selecting a pick-up location, from among the plurality of potential pick-up locations, that least increases a travel time of the responding vehicle.

16. A method for providing platoon leadership as a service, comprising:
  determining or predicting a situation class for an environment a responding vehicle is traveling through;
  maintaining an experience rating associated with the situation class, the experience rating indicating an amount of experience the responding vehicle has in handling the situation class;
  receiving, from a platoon, a request for a platoon leader, the request indicating a location and the situation class;
  sending out a search query for a vehicle having experience in handling the situation class;
  receiving, from the responding vehicle, a response to the search query, the response indicating an experience level in handling the situation class;
  selecting the responding vehicle as a new leader based at least in part on the response;
  assigning the new leader to the platoon; and providing instructions to the new leader that cause the new leader to assume a lead position in the platoon and lead the platoon through an area exhibiting the situation class.

17. The method of claim 16, wherein the sending out the search query comprises:

defining a region containing the location of the platoon; and broadcasting the search query to one or more vehicles located within the region.

18. The method of claim 16:

wherein the receiving the response to the search query comprises receiving a plurality of responses, a response, of the plurality of responses, indicating a corresponding experience level and a corresponding current location of a corresponding vehicle, and further comprising:

determining a match score for the corresponding vehicle based at least in part on the corresponding experience level and the corresponding current location; and selecting the responding vehicle, from among the plurality of vehicles, as a new leader based on a match score associated with the responding vehicle.

19. The method of claim 16, further comprising:

maintaining a database that includes one or more leader profiles and associated leadership evaluation metrics;

updating the database based on a performance of a leader vehicle after an assignment; and the selecting the responding vehicle comprises selecting the responding vehicle as the new leader based at least in part on information stored in the database associated with the responding vehicle.

20. The method of claim 16, wherein the response to the search query from the responding vehicle includes destination information associated with the responding vehicle, the method further comprising:

coordinating a rendezvous between the new leader and the platoon by identifying a plurality of potential pick-up locations; and selecting a pick-up location, from among the plurality of potential pick-up locations, that least increases a travel time of the responding vehicle.

* * * * *